United States Patent
Wang

(10) Patent No.: US 11,221,668 B2
(45) Date of Patent: Jan. 11, 2022

(54) CONTROL METHOD OF DISPLAY SCREEN AND CONTROL APPARATUS OF DISPLAY SCREEN

(71) Applicant: BOE TECHNOLOGY GROUP CO., LTD., Beijing (CN)

(72) Inventor: Yongbo Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 746 days.

(21) Appl. No.: 16/074,332

(22) PCT Filed: Dec. 13, 2017

(86) PCT No.: PCT/CN2017/115919
§ 371 (c)(1),
(2) Date: Jul. 31, 2018

(87) PCT Pub. No.: WO2018/205599
PCT Pub. Date: Nov. 15, 2018

(65) Prior Publication Data
US 2021/0208669 A1 Jul. 8, 2021

(30) Foreign Application Priority Data

May 9, 2017 (CN) .......................... 201710321195.3

(51) Int. Cl.
*G06F 3/147* (2006.01)
*H04N 21/442* (2011.01)
(Continued)

(52) U.S. Cl.
CPC .............. *G06F 3/011* (2013.01); *G01S 15/04* (2013.01); *G06F 3/147* (2013.01); *G09G 3/00* (2013.01); *H04N 21/44218* (2013.01)

(58) Field of Classification Search
CPC ... H04N 21/44218; G06F 3/011; G06F 3/147; G01S 15/04
See application file for complete search history.

(56) References Cited

U.S. PATENT DOCUMENTS 4,641,191 A * 2/1987 Sutton ...................... H04N 5/57
348/687
4,644,509 A * 2/1987 Kiewit .................... G01S 15/88
367/104

(Continued)

FOREIGN PATENT DOCUMENTS

CN 101064804 A 10/2007
CN 201336128 Y 10/2009
(Continued)

OTHER PUBLICATIONS

First Office Action dated Dec. 11, 2019, for corresponding Chinese application 201710321195.3.

(Continued)

*Primary Examiner* — James R Sheleheda
(74) *Attorney, Agent, or Firm* — Nath, Goldberg & Meyer; Joshua B. Goldberg

(57) ABSTRACT

The present disclosure provides a control method of a display screen and a control apparatus of a display screen. The control method of a display screen of the present disclosure includes: detecting, using an ultrasonic detection device, whether there is a viewer present in a viewable range of the display screen, and generating a detection result; and controlling on-off status of the display screen according to the detection result.

15 Claims, 5 Drawing Sheets

(51) Int. Cl.
*G06F 3/01* (2006.01)
*G09G 3/00* (2006.01)
*G01S 15/04* (2006.01)

(56) References Cited

U.S. PATENT DOCUMENTS

| | | | |
|---|---|---|---|
| 6,243,323 B1* | 6/2001 | Li | G01S 15/102 367/138 |
| 6,259,486 B1* | 7/2001 | Mahvi | H04N 5/44 348/553 |
| 8,237,696 B2 | 8/2012 | Chung et al. | |
| 2005/0120366 A1* | 6/2005 | Thurbon | H04N 21/44222 725/9 |
| 2009/0052859 A1* | 2/2009 | Greenberger | H04N 21/44218 386/213 |
| 2010/0191350 A1* | 7/2010 | Ohno | H04N 21/4436 700/40 |
| 2012/0062556 A1 | 3/2012 | Yamamoto et al. | |
| 2012/0229431 A1* | 9/2012 | Hiroki | G09G 3/003 345/204 |
| 2013/0286783 A1* | 10/2013 | Sussman | G01S 15/10 367/93 |
| 2017/0220570 A1* | 8/2017 | Tilaye | H04N 21/44218 |
| 2019/0246172 A1* | 8/2019 | Cheong | G06F 3/01 |
| 2019/0320132 A1* | 10/2019 | Moon | H04N 21/485 |

FOREIGN PATENT DOCUMENTS

| | | | |
|---|---|---|---|
| CN | 201707877 U | | 1/2011 |
| CN | 103065602 A | | 4/2013 |
| CN | 105047178 A | | 11/2015 |
| CN | 205157783 U | | 4/2016 |
| CN | 105812934 A | * | 7/2016 |
| CN | 105812934 A | | 7/2016 |
| JP | H2-254393 A | | 10/1990 |

OTHER PUBLICATIONS

International Search Report dated Mar. 15, 2018 issued in corresponding Application No. PCT/CN2017/115919.

* cited by examiner

US 11,221,668 B2

CONTROL METHOD OF DISPLAY SCREEN AND CONTROL APPARATUS OF DISPLAY SCREEN

CROSS-REFERENCE TO RELATED APPLICATIONS

The present application claims the priority of Chinese Patent Application No. 201710321195.3, filed on May 9, 2017, in the Chinese Intellectual Property Office, the contents of which are incorporated herein in their entirety by reference.

TECHNICAL FIELD

The present disclosure relates to the field of display technology, and in particular, relates to a control method of a display screen and a control apparatus of a display screen.

BACKGROUND

At present, electronic galleries or advertising screens are provided in many public places for the use of aspects such as media communication or advertisement. In general, an electronic gallery or advertising screen displays at all times for the purpose of allowing a person passing by the electronic gallery or advertising screen at any time to see the contents displayed by the electronic gallery or advertising screen. In some cases, it is desired to determine whether the electronic gallery or advertising screen displays or not, according to whether there is a viewer present in a viewable range of the electronic gallery or advertising screen.

SUMMARY

The present disclosure provides a control method of a display screen, including:

detecting, by an ultrasonic detection device, whether there is a viewer present in a viewable range of the display screen, and generating a detection result; and controlling on-off status of the display screen according to the detection result.

According to an embodiment of the present disclosure, the detecting, by an ultrasonic detection device, whether there is a viewer present in a viewable range of the display screen, includes:

emitting, by the ultrasonic detection device, ultrasonic beams along different detecting directions to perform scanning in the viewable range, and recording a first property value of an echo wave of an ultrasonic beam emitted in each of the detecting directions as a detection value in that detecting direction; and comparing the detection value in each of the detecting directions with a pre-stored reference value of the detecting direction, and determining whether there is a viewer present in the viewable range according to the comparison result, wherein the reference value is the first property value of an echo wave of an ultrasonic beam emitted by the ultrasonic detection device when there is no viewer present in the viewable range of the display screen.

According to an embodiment of the present disclosure, the first property value includes an echo time of an ultrasonic beam emitted in a corresponding detecting direction, and the determining whether there is a viewer present in the viewable range according to the comparison result, includes: if the detection value is greater than or equal to the reference value, then determining that there is no viewer present in the viewable range, otherwise, determining that there is a viewer present in the viewable range.

According to an embodiment of the present disclosure, the first property value includes an echo intensity of an ultrasonic beam emitted in a corresponding detecting direction, and the determining whether there is a viewer present in the viewable range according to the comparison result, includes: if the detection value is smaller than the reference value, then determining that there is no viewer present in the viewable range, otherwise, determining that there is a viewer present in the viewable range.

According to an embodiment of the present disclosure, before the detecting, by an ultrasonic detection device, whether there is a viewer present in the viewable range of the display screen and generating the detection result, the method further includes:

determining, by the ultrasonic detection device, the viewable range of the display screen.

According to an embodiment of the present disclosure, the viewable range is defined by a user.

According to an embodiment of the present disclosure, the determining, by the ultrasonic detection device, the viewable range of the display screen, includes:

calculating a cosine value of an angle between a center view distance and an edge view distance, according to a length of the center view distance and a length of the edge view distance of the display screen, so as to obtain a viewable angle of the viewable range, wherein the center view distance is a predetermined value for indicating a vertical distance from the display screen to a viewer when the viewer normally views the display screen, the edge view distance is a distance from a viewer to an edge of the display screen close to the viewer when the viewer moves along a viewing line until an image on the display screen which satisfies a predetermined condition has been observed by the viewer, wherein the viewing line is a straight line parallel to the display screen and apart from the display screen by the predetermined value, and the predetermined condition includes at least one of the following: that a color cast occurs in an image on the display screen, that an image has distortion, that an image on the display screen has a non-uniform brightness, and that an image on the display screen has a brightness smaller than a predetermined brightness threshold.

According to an embodiment of the present disclosure, before the detecting, by an ultrasonic detection device, whether there is a viewer present in a viewable range of the display screen and generating a detection result, the method further includes:

determining each of detecting directions in which the ultrasonic detection device emits ultrasonic beams within the viewable range.

According to an embodiment of the present disclosure, the ultrasonic detection device emits an ultrasonic beam every time it rotates by a first angle, and the determining each of detecting directions in which the ultrasonic detection device emits ultrasonic beams within the viewable range, includes:

calculating the first angle of the ultrasonic detection device, according to a distance between a first point on a viewing line and the ultrasonic detection device, a predetermined horizontal distance, and a distance from a second point on the viewing line, which is apart from the first point by the predetermined horizontal distance, to the ultrasonic detection device, wherein the viewing line is a straight line parallel to the display screen and apart from the display screen by a predetermined value, the predetermined value indicates a vertical distance from the display screen to a viewer when the viewer normally views the display screen, and the distance between a first point and the ultrasonic detection device indicates a distance from a viewer to an edge of the display screen close to the viewer when the viewer moves along the viewing line until an image on the display screen which satisfies a predetermined condition has been observed by the viewer, wherein the viewing line is a straight line parallel to the display screen and apart from the display screen by the predetermined value, and the predetermined condition includes at least one of the following: that a color cast occurs in an image on the display screen, that an image has distortion, that an image on the display screen has a non-uniform brightness, and that an image on the display screen has a brightness smaller than a predetermined brightness threshold, and the predetermined horizontal distance indicates a length of a segment on the viewing line corresponding to a beam angle of the ultrasonic detection device; and determining each of the detecting directions according to the viewable range and the first angle of the ultrasonic detection device.

According to an embodiment of the present disclosure, the calculating the first angle of the ultrasonic detection device includes:

calculating the first angle by which the ultrasonic detection device rotates according to equation $$\cos\theta = \frac{L^2 + L_1^2 - S'^2}{2L*L1}$$

wherein L is the distance between the first point and the ultrasonic detection device, L1 is the distance from the second point to the ultrasonic detection device, S' is the predetermined horizontal distance, and L and L1 are obtained when the ultrasonic detection device is placed at an edge of the display screen closest to the first point.

The present disclosure provides a control apparatus of a display screen, including: at least one ultrasonic detection device and a control device;

wherein the ultrasonic detection device is coupled to the display screen, and the ultrasonic detection device is configured to detect whether there is a viewer present in a viewable range of the display screen, generate a detection result, and send the detection result to the control device, and the control device is electrically connected to the ultrasonic detection device, and is configured to control on-off status of the display screen according to the detection result.

According to an embodiment of the present disclosure, the ultrasonic detection device is configured to emit ultrasonic beams along different detecting directions to perform scanning in the viewable range, and record a first property value of an echo wave of an ultrasonic beam emitted in a corresponding one of the detecting directions as a detection value in the detecting direction, wherein the ultrasonic detection device is further configured to compare the detection value in each of the detecting directions with a pre-stored reference value of the detecting direction, determine whether there is a viewer present in the viewable range according to the comparison result, the reference value being a first property value of an echo wave of an ultrasonic beam emitted by the ultrasonic detection device when there is no viewer in the viewable range of the display screen.

According to an embodiment of the present disclosure, the ultrasonic detection device is disposed on an edge frame of the display screen parallel to a horizontal direction and is positioned on a central axis in a vertical direction.

According to an embodiment of the present disclosure, the ultrasonic detection device is disposed on an edge frame of the display screen perpendicular to a horizontal direction.

According to an embodiment of the present disclosure, the ultrasonic detection device includes an ultrasonic angle component, and the ultrasonic angle component is configured to determine the viewable range of the display screen.

According to an embodiment of the present disclosure, the control apparatus of a display screen further includes a driving device, which is electrically connected to the ultrasonic detection device and configured to drive the ultrasonic detection device to rotate such that the ultrasonic detection device performs detection in the viewable range of the display screen.

According to an embodiment of the present disclosure, the driving device includes a stepper motor.

DETAILED DESCRIPTION

In the related art, a camera or an infrared detection method is generally employed to determine whether there is a viewer present in a viewable range of an electronic gallery or advertising screen, to turn on the electronic gallery or advertising screen when there is a viewer present, so as to save resources for displaying. However, the detecting of the presence of a person in the viewing area by using a camera, is limited by a wide-angle range of the camera and a data processing capability of a TV chip, and it is difficult to achieve wide-range, rapid processing of events; and the detecting of the presence of a person in the viewing area by using an infrared detection method, is subject to a large interference during the detection, and suffered from many determination errors, i.e., poor accuracy.

For this reason, the present disclosure provides a control method of a display screen and a control apparatus of a display screen, which are capable of accurately determining whether there is a viewer present in a viewable range of a display screen and controlling on-off status of the display screen according to the determination result.

In order to better understand technical solutions of the present disclosure for a person skilled in the art, the present disclosure is described in further detail below in conjunction with the accompanying drawings and specific implementations.

Referring to FIGS. 1 to 7, a control method of a display screen provided by an embodiment of the present disclosure includes steps S1 to S4.

Figure 1:
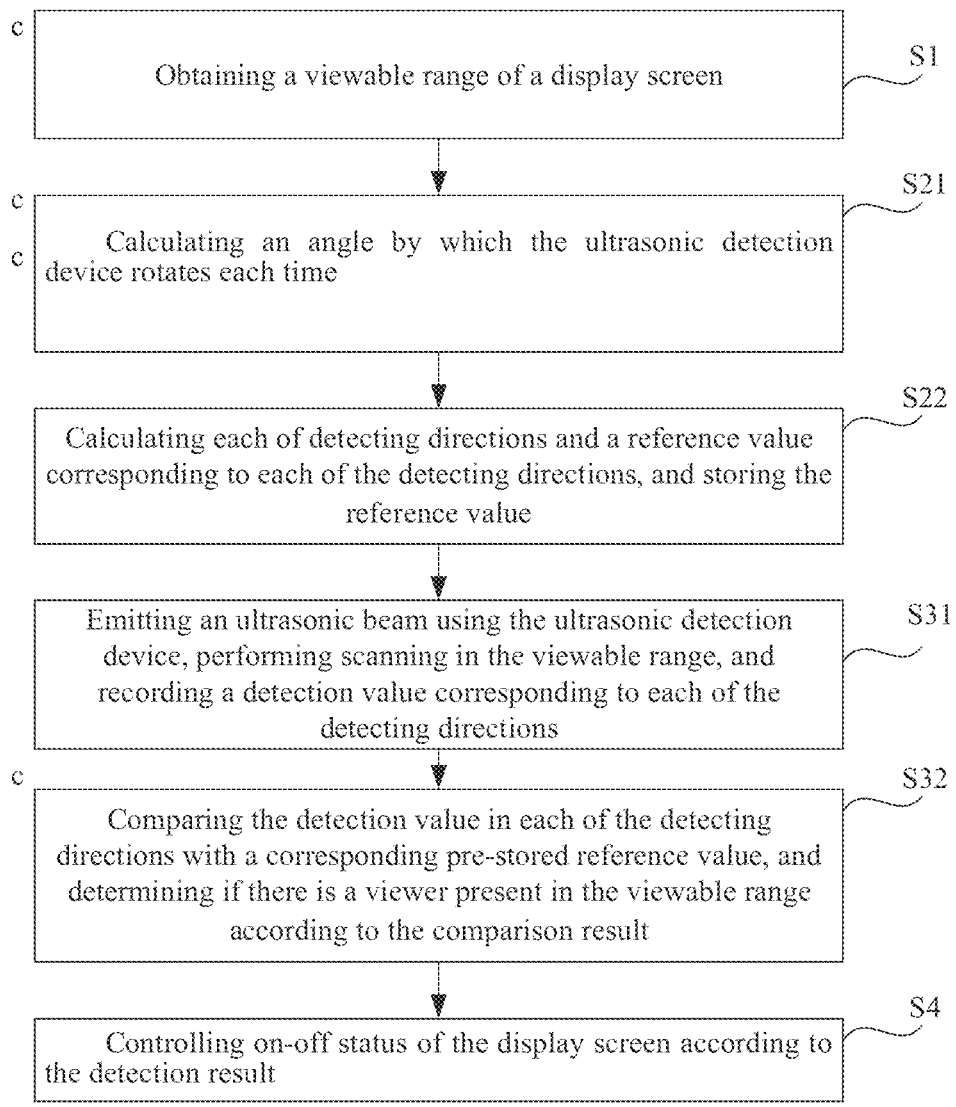
FIG. 1 is a schematic flowchart of a control method of a display screen according to an embodiment of the present disclosure.
Figure 2:
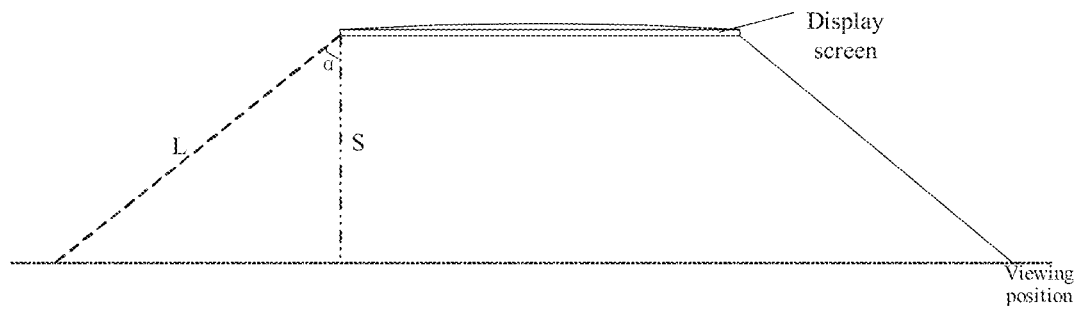
FIG. 2 is a schematic diagram of determining a viewable range of a display screen in Step S1 of FIG. 1.

At step S1, a viewable angle of a viewable range of a display screen is determined using an ultrasonic detection device. It is to be noted that the viewable range of the display screen refers to an area in which a viewer can clearly observe all contents on the display screen, and a size of the viewable range is related to the viewable angle. Referring to FIG. 2, α is a viewable angle of the display screen at one side. That is to say, when a straight line from a position of the viewer to an edge of the screen close to the viewer makes an angle α with a normal line of the screen, the viewer can still clearly see all the contents on the screen (that is, there is no color distortion in images on the display screen). A sum of viewable angles at both sides may indicate the size of the viewable range. Since a current display screen has viewable angles which are bilaterally symmetrical, the viewable angle is A=2α.

Step S1 includes:

Calculating a cosine value of an angle α between a center view distance S and an edge view distance L according to values of the center view distance S and the edge view distance L of the display screen, so as to obtain an angle for the viewable range. The center view distance S is a predetermined value for indicating a vertical distance from the display screen to a viewer when the viewer normally views the display screen. Generally, the center view distance S is an empirical value, usually, S=1.5 m to 2.5 m. The edge view distance L is a distance from a viewer to an edge of the display screen close to the viewer when the viewer moves along a viewing line, which is parallel to the display screen and is away from the display screen by the center view distance S, until an image on the display screen which satisfies a predetermined condition has been observed. The viewing line is a straight line parallel to the display screen and apart from the display screen by the predetermined value. The predetermined condition includes at least one of the following: that a color cast occurs in an image on the display screen, that an image has distortion, that an image on the display screen has a non-uniform brightness, and that an image on the display screen has a brightness smaller than a predetermined brightness threshold. The edge view distance L may be measured using an ultrasonic detection device placed on the edge of the display screen close to the viewer, and the viewing line is a straight line parallel to the display screen and apart from the display screen by the predetermined value (i.e., the center view distance S).

Thereafter, a size of α is calculated based on cos α=S/L, and then a size of the viewable angle A corresponding to the viewable range is calculated based on A=2×α.

Needless to say, a method for determining the viewable range of the display screen is not limited thereto, and other methods can also be employed, for example, a viewable range provided by a manufacturer of the display screen may be applied using a test specification of the display screen. Alternatively, a user may self-define a viewable range depending on specific situations of use of the display screen. It is to be noted that since there are differences between different display screens, there are also differences in viewable ranges for different display screens, which is not described in detail here.

At step S2, each of detecting directions in which the ultrasonic detection device emits ultrasonic beams in the viewable range is determined.

The ultrasonic detection device emits an ultrasonic beam every time it rotates by a first angle θ. It can be understood that the emitted ultrasonic beam is centered at the ultrasonic detection device and radiates outward at a certain beam angle, and will be reflected back immediately upon encountering an obstacle.

Step S2 includes steps S21 and S22.

Figure 3:
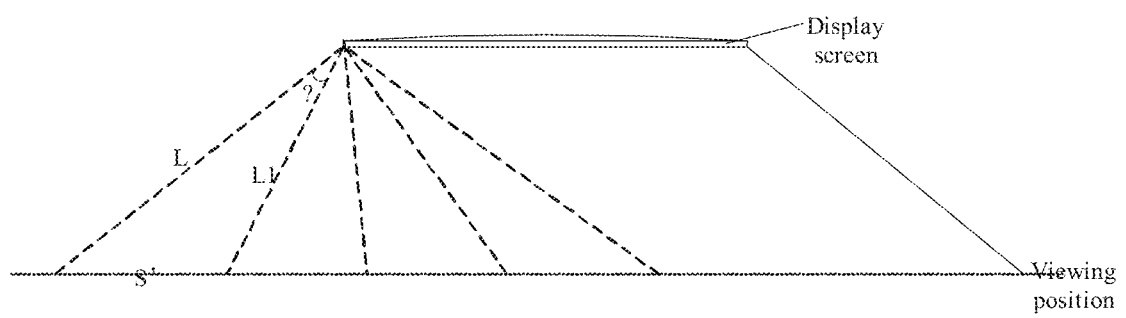
FIG. 3 is a schematic diagram of calculating an angle by which an ultrasonic detection device rotates each time in Step S21 of FIG. 1.

Referring to FIG. 3, at step S21, the angle θ by which the ultrasonic detection device rotates each time is calculated.

Specifically, Step S21 is:

calculating the angle θ by which the ultrasonic detection device rotates each time, according to equation $$\cos\theta = \frac{L^2 + L_1^2 - S'^2}{2L*L1}$$

L is a distance between a first point on the viewing line and the ultrasonic detection device, and L1 is a distance from a second point on the viewing line, which is apart from the first point by a predetermined horizontal distance S', to the ultrasonic detection device. S' is the predetermined horizontal distance, which is related to properties of the ultrasonic detection device itself, such as a beam angle of the ultrasonic detection device. The larger the beam angle of the ultrasonic detection device, the longer the predetermined horizontal distance S' may be determined to be. It can be seen that, in order to achieve rapid measurement, an ultrasonic detection device having a large beam angle may be selected, which can increase the angle that the ultrasonic detection device rotates each time, further reducing the number of times the ultrasonic detection device rotates. The viewing line is a straight line parallel to the display screen and apart from the display screen by a predetermined value, the predetermined value indicates a vertical distance from the display screen to a viewer when the viewer normally views the display screen, and the distance between a first point and the ultrasonic detection device indicates a distance from a viewer to an edge of the display screen close to the viewer when the viewer moves along the viewing line until an image on the display screen which satisfies a predetermined condition has been observed, wherein the viewing line is a straight line parallel to the display screen and apart from the display screen by the predetermined value, and the predetermined condition includes at least one of the following: that a color cast occurs in an image on the display screen, that an image has distortion, that an image on the display screen has a non-uniform brightness, and that an image on the display screen has a brightness smaller than a predetermined brightness threshold.

It can be understood that, the above-described L and L1 may be measured by the ultrasonic detection device. A method for determining L1 is as follows: rotating the ultrasonic detection device when a viewer is at the second point, to adjust a direction along which the ultrasonic detection device emits an ultrasonic beam, such that an ultrasonic beam reflected and received has a maximum intensity, and at this time, the distance between the viewer and the ultrasonic detection device is determined as L1. A method for determining L is similar to that for determining L1, which is not repeated here. As described above, S' is also an empirical value, usually S'<20 cm, and when S' has a certain value within this range, cos θ can be calculated according to the above equation, and thus the angle θ by which the ultrasonic detection device rotates each time can be obtained.

In one example, L and L1 are measured when the ultrasonic detection device is at a position on an edge of the display screen close to a viewer. It is to be noted that, when detecting a viewer by normally using the ultrasonic detection device in a case where L and L1 are already measured, the ultrasonic detection device may be provided at any position of the display screen as necessary.

At step S22, each of detecting directions, according to the viewable angle A corresponding to the viewable range and the angle θ by which the ultrasonic detection device rotates, is calculated. For convenience of description, a straight line along which each of the detecting directions lies may be defined as a respective one of detecting lines.

Referring to FIG. 3, a dashed line of FIG. 3 represents a detecting line. L is a distance between a first point on the viewing line and the ultrasonic detection device, and L1 is a distance from a second point on the viewing line, which is apart from the first point by the predetermined horizontal distance S', to the ultrasonic detection device. The distance between a first point and the ultrasonic detection device indicates a distance from a viewer to an edge of the display screen close to the viewer when the viewer moves along the viewing line until an image on the display screen which satisfies a predetermined condition has been observed, the viewing line is a straight line parallel to the display screen and apart from the display screen by the predetermined value, and the predetermined condition includes at least one of the following: that a color cast occurs in an image on the display screen, that an image has distortion, that an image on the display screen has a non-uniform brightness, and that an image on the display screen has a brightness smaller than a predetermined brightness threshold. A straight line where L lies may be a first detecting line, and a straight line where L1 lies may be a second detecting line, and the first detecting line and the second detecting line are straight lines along two different directions towards which the ultrasonic detection device emits ultrasonic beams in chronological sequence, wherein the first detecting line corresponds to a first direction towards which the ultrasonic detection device emits an ultrasonic beam, and the second detecting line corresponds to a second direction towards which the ultrasonic detection device emits an ultrasonic beam. When the ultrasonic detection device rotates from the first direction to the second direction, it rotates by the angle of θ. Optionally, the ultrasonic detection device rotates by the same angle each time, then, it can be calculated how many times the ultrasonic detection device rotates in viewable angle A according to an equation n=A/θ, so as to determine each of the directions in which the ultrasonic detection device rotates each time, that is, a position of each of the detecting lines. Furthermore, a reference value for an echo wave along each of the detecting lines is recorded and stored after each rotation.

It is to be noted, that, steps S1 and S2 are not necessarily performed every time when detecting whether there is a viewer using the ultrasonic detection device. In one example, when setting up and using an ultrasonic detection device for the first time at a site, steps S1 and S2 are performed, to obtain and set initialization parameters, and in the subsequent process of detecting whether there is a viewer using the ultrasonic detection device, steps S1 and S2 are no longer performed. In one example, steps S1 and S2 may also be performed every time.

At step S3, whether there is a viewer present in the viewable range of the display screen using the ultrasonic detection device is detected, and its detection result is generated.

Step S3 includes steps S31 and S32.

At step S31, an ultrasonic beam is emitted by the ultrasonic detection device, scanning is performed in the viewable range, and a first property value of an echo wave is recorded in each of the detecting directions as a detection value in that detecting direction. The first property value includes an echo time of the emitted ultrasonic beam (that is, time elapsed from the emission of the ultrasonic beam by the ultrasonic detection device to the reception of the same ultrasonic beam), and then the detection value is the echo time in each of the detecting directions.

At step S32, the detection value in each of the detecting directions is compared with a pre-stored reference value of that detecting direction, and it is determined whether there is a viewer present in the viewable range according to the comparison result, wherein the reference value is a first property value (e.g., echo time) of an echo wave of an ultrasonic beam emitted by the ultrasonic detection device when there is no viewer in the viewable range of the display screen.

Figure 4:
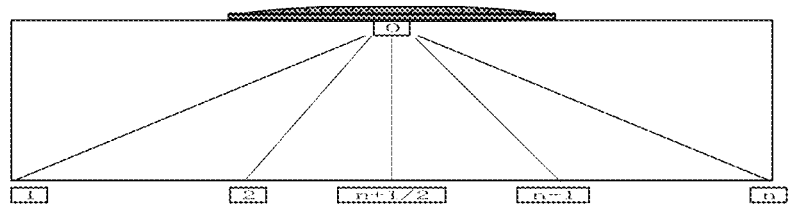
FIG. 4 is a schematic diagram of detecting lines in Step S3 of FIG. 1.

It is to be noted that, referring to FIG. 4, it is assumed that ultrasonic beams may be emitted in respective directions of n detecting lines in the viewable range by the rotation of the ultrasonic detection device, the ultrasonic beams in respective ones of the directions are emitted successively, an echo wave of an ultrasonic beam emitted in each of the directions has a pre-stored reference value, for example, a reference value of "0", and it can be understood that, each reference value also includes a first property value of the echo wave of the ultrasonic beam in that direction.

That is to say, when comparing the detection value with the reference value, what is actually compared for is the difference between the echo time corresponding to the detection value and the echo time corresponding to the reference value.

Figure 5:
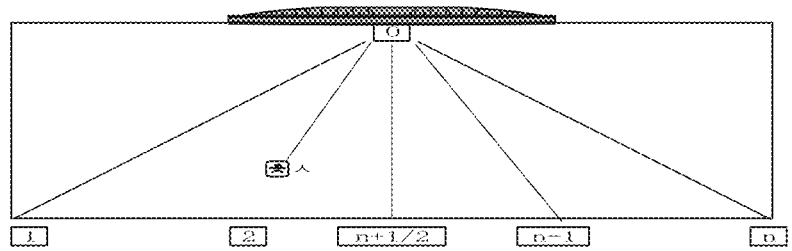
FIG. 5 is another schematic diagram of detecting lines in Step S3 of FIG. 1.

Specifically, step S32 includes:

Referring to FIG. 5, when the ultrasonic detection device emits an ultrasonic beam in a direction where the second detecting line lies, if the ultrasonic beam radiates on a viewer's body, then an echo time of the ultrasonic beam in the direction where the second detecting line lies is shorter than an echo time corresponding to the reference value, and at this time, the comparison result detected in this direction is recorded. For example, the comparison result detected in this detecting line may be recorded as "1". Needless to say, if the echo time detected in this direction is equal to the echo time corresponding to the reference value (that is, there is no difference) or the echo time detected in this direction is longer than the echo time corresponding to the reference value, then the comparison result detected in this detecting line may be recorded as "0", which is not described in detail here.

It can be understood that, if the detection result is that a detection value in each of the directions is larger than a respective reference value or the detection value is the same as a respective reference value, then the detection result indicates that there is no viewer present in the viewable range of the display screen; if the detection result is that a detection value in at least one direction is smaller than a respective reference value, then the detection result indicates that there is a viewer present in the viewable range of the display screen.

It can be understood that, in a case where there is no viewer or other obstacle both in and out of the viewable range, the detected echo time is defined as infinitely great, and in this case the detection value is greater than the reference value.

According to an embodiment of the present disclosure, the first property value may also include an echo intensity of the ultrasonic beam, then the detection value may be an echo intensity of an ultrasonic beam detected in a direction, and the reference value may be an echo intensity pre-stored for an ultrasonic beam emitted in that direction. If the detection result is that an echo intensity in each of the directions (i.e., detection value) is smaller than a pre-stored echo intensity (i.e., reference value), then the detection result indicates that there is no viewer present in the viewable range of the display screen; if the detection result is that an echo intensity in at least one direction (i.e., detection value) is greater than or equal to the pre-stored echo intensity (i.e., reference value), then the detection result indicates that there is a viewer present in the viewable range of the display screen.

It can be understood that, in a case where there is no viewer or other obstacle both in and out of the viewable range, the detected echo intensity is defined as zero, and in this case the detection value is smaller than the reference value.

The comparison result of the reference value and the detection value in each of the directions is recorded in a binary system, for example, if 6 detecting lines are pre-set, then 8-bit binary coding may be used. In this case, when no viewer is detected in the viewable range, the recorded detection result is 00000000, when a viewer is detected in the viewable range and in a direction where the second detecting line lies, the recorded detection result is 01000000, and when a viewer is detected in the viewable range and in a direction where a sixth detecting line ties, the recorded detection result is 00000100. Needless to say, a method for recording the detection result after comparing the reference value and the detection value in each of the directions is not limited thereto, and other methods may also be employed for the recording, which is not described in detail here.

At stet S4, an on-off status of the display screen is controlled according to the detection result.

That is, when the detection result indicates that there is a viewer present in the viewable range of the display screen, the display screen is controlled to be turned on, such that the display screen may perform display; when the detection result indicates that there is no viewer present in the viewable range of the display screen, the display screen is controlled to be turned off, to reduce energy consumption of the display screen, so that the lifetime of the display screen is extended.

Figure 6:
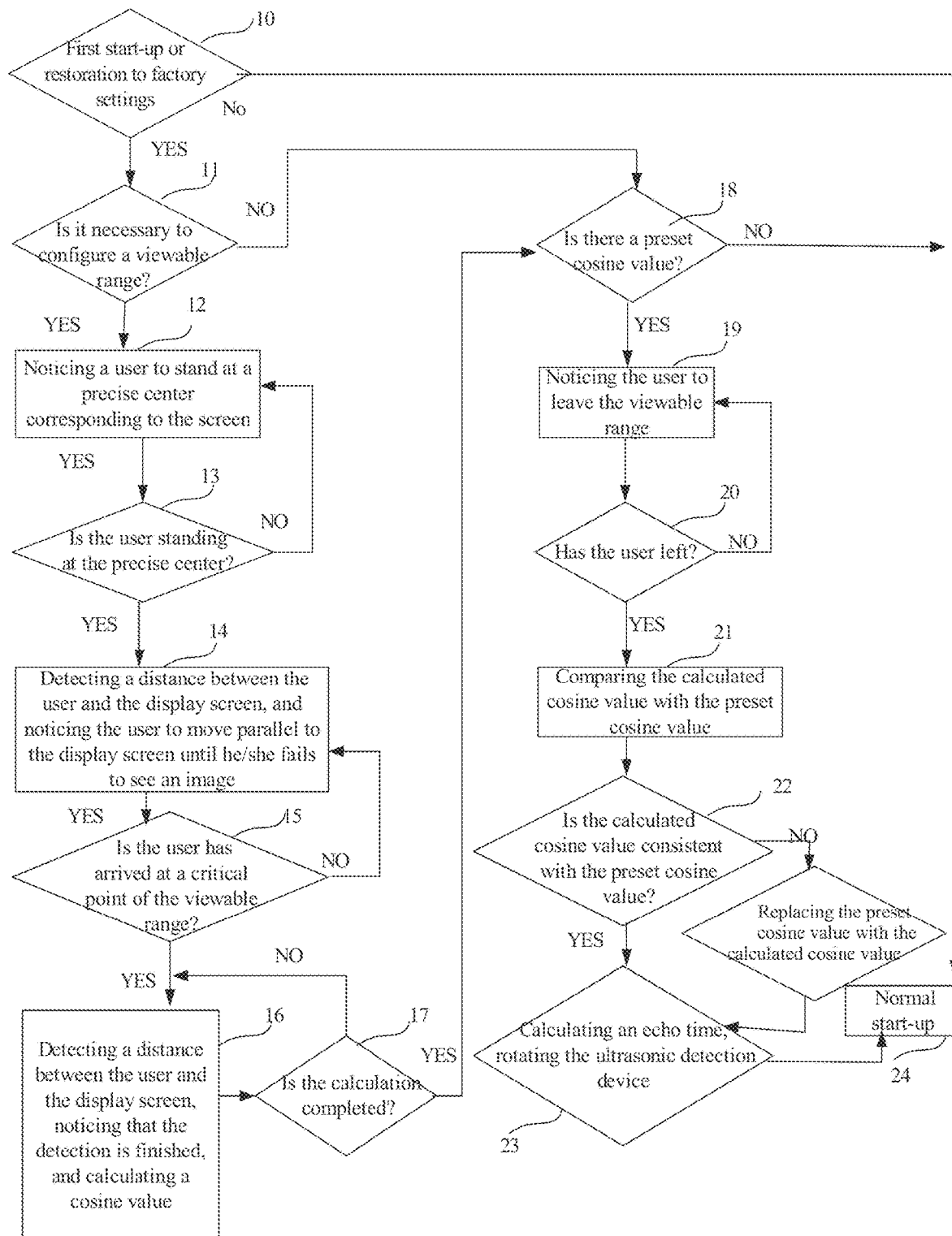
FIG. 6 is a flowchart of a method for adjusting an ultrasonic detection device connected to a display screen when the display screen is started up for the first time or started up after being restored to factory settings.
Figure 7:
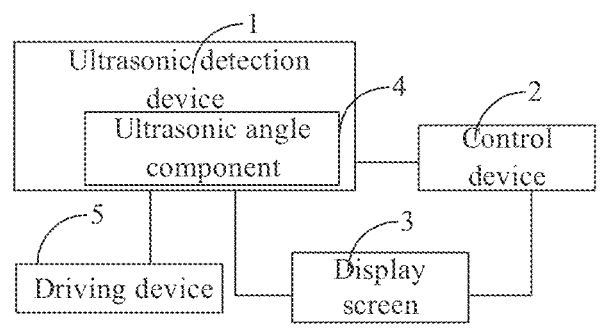
FIG. 7 is a block diagram illustrating a structure of a control apparatus of a display screen according to an embodiment of the present disclosure.

Referring to FIG. 6, when the display screen is started up for the first time or started up after being restored to factory settings, the ultrasonic detection device connected to the display screen needs to be adjusted, wherein specific steps for the adjusting includes are as follows:

Step 10, confirming whether it is either first start-up or start-up after restoration to factory settings or not. If it is, step 11 is performed; if it is not, step 24 is performed.

Step 11, confirming whether it is necessary to configure a viewable range. If it is, step 12 is performed; if it is not, step 18 is performed.

Step 12, noticing a user to stand at a position of precise center in front of the display screen.

Step 13, checking if the user is standing at the position of precise center. If yes, step 14 is performed; if no, step 12 is performed.

Step 14, detecting a distance between the user and the display screen, and if the distance between the user and the display screen is the center view distance S of Step S1, noticing the user to move parallel to the display screen until he/she fails to see an image displayed on the display screen.

Step 15, detecting if the user has arrived at a critical point of the viewable range. If yes, step 16 is performed; if no, step 14 is performed.

Step 16, detecting a distance between the user and the display screen, noticing that the detection is finished, and calculating a cosine value. The distance between the user and the display screen in this step 16 is the edge view distance L of step S1, therefore cos α can be calculated.

Step 17, checking if calculation of cos α is completed. If yes, step 18 is performed; if no, step 16 is performed again.

Step 18, checking if there is a preset cosine value. If yes, step 19 is performed; if no, step 23 is performed.

Step 19, noticing the user to leave the viewable range.

Step 20, checking if the user has left the viewable range. If yes, step 21 is performed; if no, Step 19 is performed again.

Step 21, comparing the calculated cosine value with the preset cosine value.

Step 22, checking if the calculated cosine value is consistent with the preset cosine value. If yes, it means that the ultrasonic detection device is positioned exactly on an edge frame of the display screen parallel to a vertical direction and is positioned at a side of the display screen close to the viewer, and step 23 is performed; if no, the preset cosine value is replaced with the calculated cosine value, and step 23 is performed.

Step 23, calculating a current echo time, to obtain a reference value. The ultrasonic detection device is rotated, and if it is rotated n times successively, then n reference values corresponding thereto are obtained finally, and step 24 is performed.

Step 24, performing a normal start-up.

In the above example, the ultrasonic detection device is adjusted when the display screen is started up for the first time or started up after being restored to factory settings. In some examples, it is also possible to adjust the ultrasonic detection device connected to a display screen when the display screen is normally started up after being turned off (i.e., physical turn-off), specific steps of which are similar to those shown in FIG. 6, and are not repeated here.

The control method of a display screen of the present embodiment includes: detecting whether there is a viewer present in a viewable range of the display screen using an ultrasonic detection device, generating a detection result and controlling on-off status of the display screen according to the detection result. That is, utilizing ultrasonic detection technology, it is possible to achieve automatic turn-off of the display screen when there is no person present in the viewable range of the display screen, and automatic turn-on of the display screen to perform display when there is a viewer who enters the viewable range. That is, the control method of a display screen of the present embodiment can achieve rapid processing of events, and not only increase convenience of use of the display screen, but also reduce energy consumption of the display screen, and extend the lifetime of the display screen.

Referring to FIGS. 7 to 11, an embodiment of the present disclosure provides a control apparatus of a display screen, including an ultrasonic detection device 1 and a control device 2. The ultrasonic detection device 1 is coupled to a display screen 3, and is configured to detect whether there is a viewer present in a viewable range of the display screen 3, generate a detection result, and send the detection result to the control device 2. The control device 2 is electrically connected to the ultrasonic detection device 1, and is configured to control on-off status of the display screen 3 according to the detection result.

The ultrasonic detection device 1 may be disposed on an edge frame of the display screen 3 parallel to a horizontal direction and be positioned on a central axis in a vertical direction.

Figure 8:
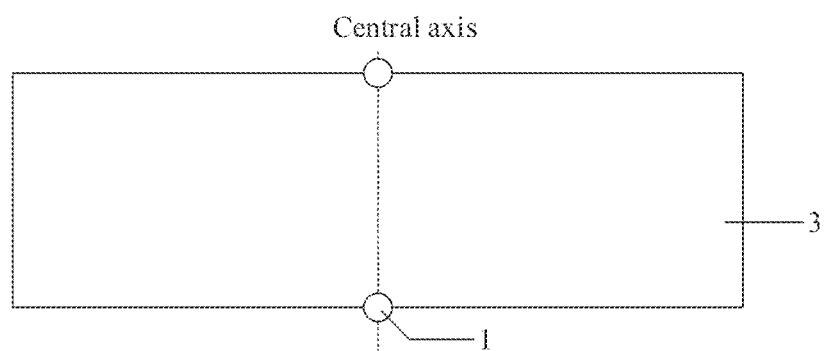
FIG. 8 is a schematic diagram showing installation position of ultrasonic detection devices of the control apparatus of a display screen according to an embodiment of the present disclosure.

The display screen 3 is generally disposed as shown in FIG. 8. The edge frame of the display screen 3 parallel to the horizontal direction is two long sides on the top and bottom along the horizontal direction in FIG. 8, and a line connecting midpoints of respective long sides is the central axis. Since the ultrasonic detection device 1 cannot be disposed in an area of the display screen 3 used for displaying, actually the ultrasonic detection device 1 may be disposed on a long side, for example, disposed on a midpoint of a long side along the horizontal direction. The reason for such an arrangement is that a small number of ultrasonic detection devices 1 can be disposed and the design is simple. Needless to say, when the display screen 3 is hung at a high position, in consideration of practicability, the ultrasonic detection device 1 may not be disposed on the midpoint of the long side, and may be disposed on the central axis beyond the display screen.

The ultrasonic detection device 1 may also be disposed on an edge frame of the display screen 3 perpendicular to the horizontal direction.

Figure 9:
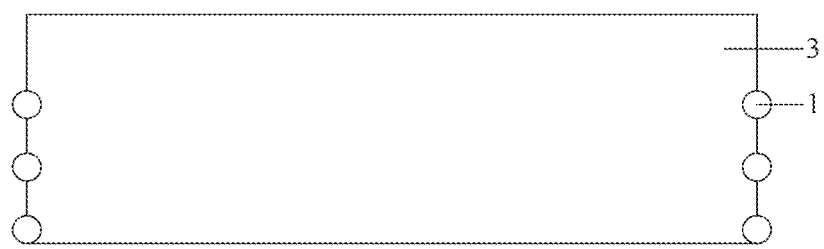
FIG. 9 is another schematic diagram showing installation position of ultrasonic detection devices of the control apparatus of a display screen according to an embodiment of the present disclosure.

The display screen 3 is generally disposed as shown in FIG. 9. The edge frame of the display screen 3 perpendicular to the horizontal direction is two short sides on the left and right in FIG. 9. The number of ultrasonic detection devices 1 may be varied according to the size of the display screen 3, and spacing between multiple ultrasonic detection devices 1 may be set according to actual situation, and uniform spacing is not necessary. The reason for such an arrangement is that such an arrangement provides a wider range of detection in a case of a same scanning angle and there is no detection blind area. Needless to say, when the display screen 3 is hung at a high position, in consideration of practicability, the ultrasonic detection devices 1 may not be disposed at upper positions of the two short sides on the left and right.

The ultrasonic detection device 1 includes an ultrasonic angle component 4 configured to determine the viewable range of the display screen 3.

It is to be noted that, the ultrasonic angle component 4 is a part of the ultrasonic detection device 1, that is, a position where the ultrasonic detection device 1 is disposed is a position where the ultrasonic angle component 4 is disposed. The ultrasonic angle component 4 can detect the viewable range of the display screen 3 so as to determine the viewable range of the display screen 3.

Figure 10:
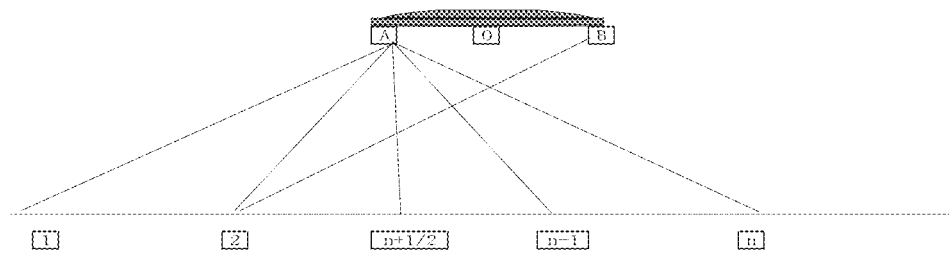
FIG. 10 is another schematic diagram of recording a reference value of each of detecting lines.
Figure 11:
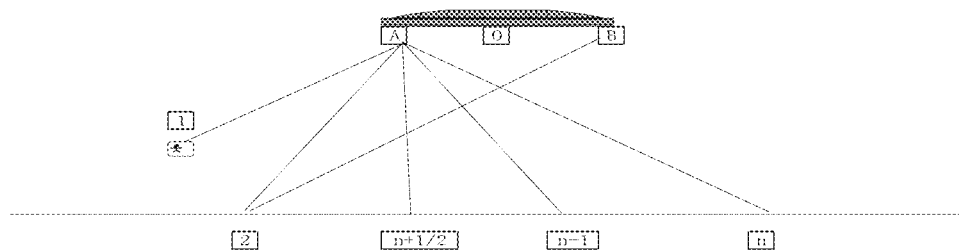
FIG. 11 is another schematic diagram of obtaining and recording a detection value of each of detecting lines.

It is to be noted that, although the above embodiment has described how to determine a viewable range and how to detect whether there is a viewer present in the viewable range only with respect to the solution in which the ultrasonic detection device 1 is positioned on the edge frame parallel to the horizontal direction and positioned on the central axis of the vertical direction, the method of the above embodiment may also be employed when the ultrasonic angle component 4 is positioned on an edge frame of the display screen 3 perpendicular to the horizontal direction, as shown in FIGS. 10 and 11, which is not repeated here.

The control apparatus of a display screen further includes a driving device 5, which is electrically connected to the ultrasonic detection device 1 and configured to drive the ultrasonic detection device 1 to rotate, such that the ultrasonic detection device 1 may detect the viewable range of the display screen 3.

In the present embodiment, by providing the driving device 5 which can drive the ultrasonic detection device 1 to rotate, the ultrasonic detection device 1 can detect the viewable range of the display screen 3.

Optionally, the driving device 5 includes a stepper motor. Needless to say, a type of the driving device 5 is not limited thereto, and other types of driving member may also be employed, which is not described in detail here.

The control apparatus of a display screen of the present embodiment is configured to achieve the control method of a display screen of the above-described embodiment, and one may refer to the control method of a display screen of the above-described embodiment for detailed description thereof; which is not repeated here.

The control apparatus of a display screen of the present embodiment, utilizing ultrasonic detection technology, can achieve automatic turn-off of the display screen when there is no person present in the viewable range of the display screen, and automatic turn-on of the display screen to perform display when there is a viewer who enters the viewable range. That is, the control apparatus of a display screen of the present embodiment can achieve rapid processing of events, and not only increase convenience of use of the display screen, but also reduce energy consumption of the display screen, and extend the lifetime of the display screen.

It should be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. A control method of a display screen, comprising:
   determining, by an ultrasonic detection device, a viewable range of the display screen;
   detecting, by the ultrasonic detection device, whether there is a viewer present in the viewable range of the display screen, and generating a detection result; and
   controlling on-off status of the display screen according to the detection result,
   wherein the determining, by the ultrasonic detection device, the viewable range of the display screen, comprises:
   calculating a cosine value of an angle between a center view distance and an edge view distance, according to a length of the center view distance and a length of the edge view distance of the display screen, so as to obtain a viewable angle of the viewable range, wherein the center view distance is a predetermined value for indicating a vertical distance from the display screen to a viewer when the viewer normally views the display screen, the edge view distance is a distance from a viewer to an edge of the display screen close to the viewer when the viewer moves along a viewing line until an image on the display screen which satisfies a predetermined condition has been observed, wherein the viewing line is a straight line parallel to the display screen and apart from the display screen by the predetermined value, and the predetermined condition includes at least one of the following: that a color cast occurs in an image on the display screen, that an image has distortion, that an image on the display screen has a non-uniform brightness, and that an image on the display screen has a brightness smaller than a predetermined brightness threshold.

2. The control method according to claim 1, wherein the detecting, by an ultrasonic detection device, whether there is a viewer present in a viewable range of the display screen, comprises:
  emitting, by the ultrasonic detection device, ultrasonic beams along different detecting directions to perform scanning in the viewable range, and recording a first property value of an echo wave of an ultrasonic beam emitted in each of the detecting directions as a detection value in that detecting direction; and
  comparing the detection value in each of the detecting directions with a pre-stored reference value of the detecting direction, and determining whether there is a viewer present in the viewable range according to the comparison result, wherein the reference value is the first property value of an echo wave of an ultrasonic beam emitted by the ultrasonic detection device when there is no viewer present in the viewable range of the display screen.

3. The control method according to claim 2, wherein the first property value comprises an echo time of an ultrasonic beam emitted in a corresponding detecting direction, and
  the determining whether there is a viewer present in the viewable range according to the comparison result, comprises: if the detection value is greater than or equal to the reference value, then determining that there is no viewer present in the viewable range, otherwise, determining that there is a viewer present in the viewable range.

4. The control method according to claim 2, wherein the first property value comprises an echo intensity of an ultrasonic beam emitted in a corresponding detecting direction, and
  the determining whether there is a viewer present in the viewable range according to the comparison result, comprises: if the detection value is smaller than the reference value, then determining that there is no viewer present in the viewable range, otherwise, determining that there is a viewer present in the viewable range.

5. The control method according to claim 1, further comprising,
  before the detecting, by the ultrasonic detection device, whether there is a viewer present in the viewable range of the display screen and generating a detection result:
  determining each of detecting directions in which the ultrasonic detection device emits ultrasonic beams in the viewable range.

6. The control method according to claim 5, wherein the ultrasonic detection device emits an ultrasonic beam every time it rotates by a first angle, and
  the determining each of detecting directions in which the ultrasonic detection device emits ultrasonic beams in the viewable range, comprises:
  calculating a first angle of the ultrasonic detection device, according to a distance between a first point on a viewing line and the ultrasonic detection device, a predetermined horizontal distance, and a distance from a second point on the viewing line, which is apart from the first point by the predetermined horizontal distance, to the ultrasonic detection device, wherein the viewing line is a straight line parallel to the display screen and apart from the display screen by a predetermined value, the predetermined value indicates a vertical distance from the display screen to a viewer when the viewer normally views the display screen, and the distance between a first point and the ultrasonic detection device indicates a distance from a viewer to an edge of the display screen close to the viewer when the viewer moves along the viewing line until an image on the display screen which satisfies a predetermined condition has been observed by the viewer, wherein the viewing line is a straight line parallel to the display screen and apart from the display screen by the predetermined value, and the predetermined condition includes at least one of the following: that a color cast occurs in an image on the display screen, that an image has distortion, that an image on the display screen has a non-uniform brightness, and that an image on the display screen has a brightness smaller than a predetermined brightness threshold, and the predetermined horizontal distance indicates a length of a segment on the viewing line corresponding to a beam angle of the ultrasonic detection device; and
  determining each of the detecting directions according to the viewable range and the first angle of the ultrasonic detection device.

7. The control method according to claim 6, wherein the calculating the first angle of the ultrasonic detection device comprises:
  calculating the first angle by which the ultrasonic detection device rotates, according to equation $$\cos\theta = \frac{L^2 + L_1^2 - S'^2}{2L*L1},$$

wherein L is the distance between the first point and the ultrasonic detection device, L1 is the distance from the second point to the ultrasonic detection device, S' is the predetermined horizontal distance, L and L1 are lengths of corresponding edge view distances obtained when the ultrasonic detection device is placed at an edge of the display screen closest to the first point, and θ is an angle by which the ultrasonic detection device rotates each time.

8. A control apparatus of a display screen, comprising: at least one ultrasonic detection device and a control device;
  wherein the ultrasonic detection device is coupled to the display screen, and the ultrasonic detection device is configured to detect whether there is a viewer present in a viewable range of the display screen, generate a detection result, and send the detection result to the control device, and the control device is electrically connected to the ultrasonic detection device, and is configured to control on-off status of the display screen according to the detection result, wherein the ultrasonic detection device is further configured to determine the viewable range of the display screen, and determining the viewable range of the display screen comprises:

calculating a cosine value of an angle between a center view distance and an edge view distance, according to a length of the center view distance and a length of the edge view distance of the display screen, so as to obtain a viewable angle of the viewable range, wherein the center view distance is a predetermined value for indicating a vertical distance from the display screen to a viewer when the viewer normally views the display screen, the edge view distance is a distance from a viewer to an edge of the display screen close to the viewer when the viewer moves along a viewing line until an image on the display screen which satisfies a predetermined condition has been observed, wherein the viewing line is a straight line parallel to the display screen and apart from the display screen by the predetermined value, and the predetermined condition includes at least one of the following: that a color cast occurs in an image on the display screen, that an image has distortion, that an image on the display screen has a non-uniform brightness, and that an image on the display screen has a brightness smaller than a predetermined brightness threshold.

9. The control apparatus of a display screen according to claim 8, wherein the ultrasonic detection device is configured to emit ultrasonic beams to perform scanning in the viewable range, and record a first property value of an echo wave of an ultrasonic beam emitted in a corresponding one of detecting directions as a detection value in the detecting direction,
wherein the ultrasonic detection device is further configured to compare the detection value in each of the detecting directions with a pre-stored reference value of the detecting direction, determine whether there is a viewer present in the viewable range according to the comparison result, the reference value being a first property value of an echo wave of an ultrasonic beam emitted by the ultrasonic detection device when there is no viewer in the viewable range of the display screen.

10. The control apparatus of a display screen according to claim 8, wherein the ultrasonic detection device is disposed on an edge frame of the display screen parallel to a horizontal direction and is positioned on a central axis in a vertical direction.

11. The control apparatus of a display screen according to claim 8, wherein the ultrasonic detection device is disposed on an edge frame of the display screen perpendicular to a horizontal direction.

12. The control apparatus of a display screen according to claim 8, wherein the ultrasonic detection device comprises an ultrasonic angle component, and
the ultrasonic angle component is configured to determine the viewable range of the display screen.

13. The control apparatus of a display screen according to claim 8, further comprising a driving device, which is electrically connected to the ultrasonic detection device and configured to drive the ultrasonic detection device to rotate such that the ultrasonic detection device performs detection in the viewable range of the display screen.

14. The control apparatus of a display screen according to claim 13, wherein the driving device comprises a stepper motor.

15. A control method of a display screen, comprising:
determining each of detecting directions in which an ultrasonic detection device emits ultrasonic beams in a viewable range of the display screen;
detecting, by the ultrasonic detection device, whether there is a viewer present in the viewable range, and generating a detection result; and
controlling on-off status of the display screen according to the detection result,
wherein the ultrasonic detection device emits an ultrasonic beam every time it rotates by a first angle, and
the determining each of detecting directions in which the ultrasonic detection device emits ultrasonic beams in the viewable range, comprises:
calculating a first angle of the ultrasonic detection device, according to a distance between a first point on a viewing line and the ultrasonic detection device, a predetermined horizontal distance, and a distance from a second point on the viewing line, which is apart from the first point by the predetermined horizontal distance, to the ultrasonic detection device, wherein the viewing line is a straight line parallel to the display screen and apart from the display screen by a predetermined value, the predetermined value indicates a vertical distance from the display screen to a viewer when the viewer normally views the display screen, and the distance between a first point and the ultrasonic detection device indicates a distance from a viewer to an edge of the display screen close to the viewer when the viewer moves along the viewing line until an image on the display screen which satisfies a predetermined condition has been observed by the viewer, wherein the viewing line is a straight line parallel to the display screen and apart from the display screen by the predetermined value, and the predetermined condition includes at least one of the following: that a color cast occurs in an image on the display screen, that an image has distortion, that an image on the display screen has a non-uniform brightness, and that an image on the display screen has a brightness smaller than a predetermined brightness threshold, and the predetermined horizontal distance indicates a length of a segment on the viewing line corresponding to a beam angle of the ultrasonic detection device; and
determining each of the detecting directions according to the viewable range and the first angle of the ultrasonic detection device.

* * * * *